April 2, 1929.  A. HOLLANDER  1,707,612
BEARING LUBRICATING DEVICE
Filed June 2, 1926
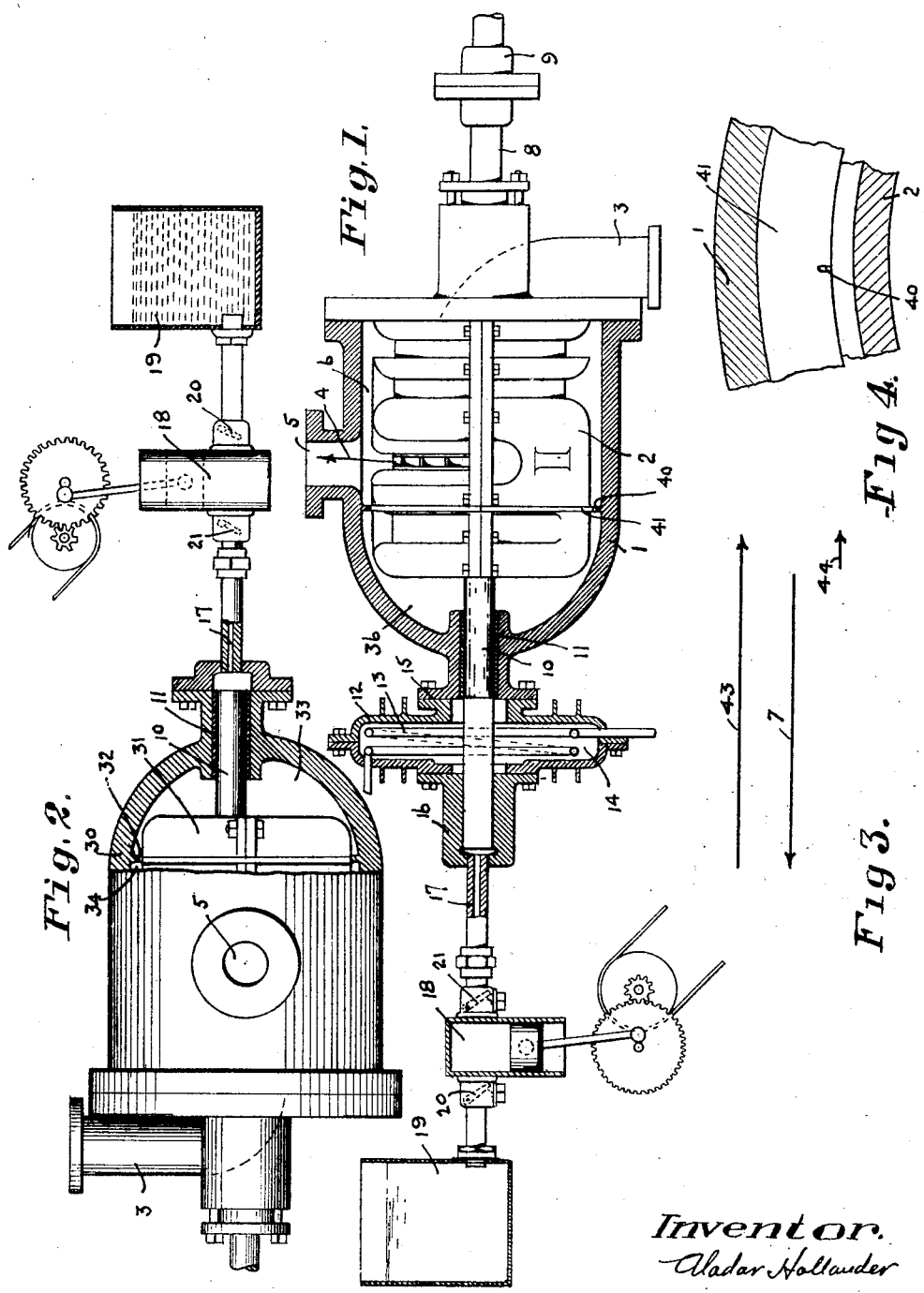

Patented Apr. 2, 1929.

1,707,612

UNITED STATES PATENT OFFICE.

ALADAR HOLLANDER, OF BERKELEY, CALIFORNIA, ASSIGNOR, BY MESNE ASSIGNMENTS, TO BYRON JACKSON PUMP CO., A CORPORATION OF DELAWARE.

BEARING-LUBRICATING DEVICE.

Application filed June 2, 1926. Serial No. 113,173.

My invention has for its object, means for lubricating bearings and particularly the lubrication of bearings exposed to heat, abrasive material, fluids inimical to lubrication and the like.

My invention is particularly adapted to maintaining the lubrication of hot oil pumps which ordinarily operate under high pressure, and pumps operating with fluids as oil or water containing sand or the like, as for example crude oil as it comes from the well and which frequently contains sand. In such apparatus heretofore the sand gets into the bearings and interferes with their proper lubrication and accomplishes their early destruction. My invention overcomes these defects.

Other objects will appear from the drawing and specifications which follow.

These objects I attain by continuously injecting oil under a pressure very slightly in excess of the pressure within the apparatus, whereby the clean lubricating oil is retained in contact with the entire bearing and journal surface and at a very slow rate is forced therethrough under the differential excess pressure.

This expended lubricating oil then passes into the pump or interior of the other apparatus and mingles with the pumped fluid.

My invention also is directed to isolating the bearing compartment within the pump or other apparatus, so that adjacent to the bearing and within the apparatus, the expended lubricating oil accumulates, forming a dam or obstructing layer of pure lubricant against the encroachment of deleterious matter.

Where the apparatus is employed for pumping fluids at high pressure, or the bearing to be lubricated is exposed to unusual heat, I attach directly to the bearing, a cooling chamber through which the lubricant is passed before it is forced between the bearing and journal surfaces. This cooling means not only cools the oil but being in physical contact with the bearing abstracts heat therefrom and retains it at a workable temperature. It also abstracts heat from the shield surrounding and supporting the bearing and thus restrains the bearing from rising to the high temperature of the supporting shield. Where the above recited compartment is employed this, with its contained and expended lubricant also serves to insulate the bearing from the hot portions of the apparatus.

By referring to the accompanying drawing, my invention will be made clear.

Fig. 1 is a cross section through a conventional apparatus adapted to pump hot oil, with my invention incorporated therewith.

Fig. 2 is a part view and part cross section of an apparatus adapted to pump a fluid containing sand or other matter inimical to the bearing.

Fig. 3 is a diagram of the pressures of the fluid being pumped and of the lubricant and the differential pressure under which the lubricant flows.

Fig. 4 is a fragmentary front view of the diaphragm portion of Fig. 1.

Throughout the figures similar numerals refer to identical parts.

A pump chamber is shown by the numeral 1, having therein a pump casing 2, enclosing a plurality of impellers in series each of which is adapted to raise the pressure of oil received through the suction pipe 3, and to finally discharge the oil under fluid pressure in the direction of the arrow 4, and from the outlet 5.

During its transmission through the impellers and casing 2, where high pressure is established the oil becomes heated, and therefore flows out at 5 as heated oil.

The hot oil under the pressure at 5 finds its way throughout the space 6, and surrounding the casing 2, which is now retained under compression.

The hot oil therefore exerts a pressure between the bearing and journal surfaces in the direction and of the magnitude shown by the arrow 7.

Such an apparatus and its operation are clearly set forth in my co-pending application, Serial No. 85,629, filed February 3, 1926.

The impellers are mounted upon the main shaft 8 driven from conventional motor means through the coupling 9.

The shaft 8 extends through the casing 2 and is journaled at 10 in the bearing 11 here shown as forming an end portion of the chamber 1. A diaphragm is shown at 41, punctured at 40 and forming the bearing compartment 36 in Fig. 1 and at 41 having the puncture 32 in Fig. 2.

Attached to the bearing supporting portion of the chamber 1 is the cooling box 12, having therein the circulating pipes 13 adapted to cool the body of oil in the spaces 14 before it passes into the bearing.

The box 12 is preferably of metal integrally connected as at 15, so that by conduction the heat is removed from the bearing.

The inlet thimble to the cooling box is shown at 16 with a receiving pipe connected thereto at 17 from the positive pressure pump 18.

The pump 18 receives its supply of oil from the tank 19 through the one way valve at 20 and discharges the oil through the one way valve 21 into the cooling box 13 and thence as cold oil it is forced between the journal 10 and bearing 11 into the pressure compartment at 6.

The pressure generated by the pump 18 is to be sufficiently in excess of the pressure generated by the impeller in casing 2, to insure injection of the oil through the bearing. Such pump pressure is shown diagrammatically by the line 43 and the differential pressure by the line 44.

The pump 18 runs very slowly so that the feeding of the oil between the journal 10 and bearing 11 is a drop-by-drop process, but sufficient always to insure a lubricant film of oil between the bearing and journal and to always prevent the ingress of any foreign material or hot oil from the chamber 1.

In the modification shown in Fig. 2, as for example the pumping of cold water having a considerable sand content and where the pressure of the pumped water is not sufficiently high to involve the generation of any considerable amount of heat, the cooling box and pipes 12, 13 respectively may be left out and the oil forced directly from the pump through the one way valve 21 and pipe 17 to the journal and bearing.

In this case, however, I prefer to introduce a diaphragm ring at 41 between the pump chamber 30 and the pump casing 31 and to perforate the said diaphragm with a small aperture 32.

This insures a body of clean oil in the entire compartment space 36 between the end of the casing 31 and the end of the chamber 30. There will then be a slow leakage or percolation of the lubricant oil from the pipe 17 between the journal and bearing 10, 11, filling the space 36, and a slow rate of leakage through the perforation at 32, the pumped water being on the other side of the said perforation and filling the space between the casing 31 and chamber 30 as at 34.

The pump 18 in both cases is of a conventional positive acting type driven by any conventional means well known but not shown.

The precooling of the oil in the box 12 is accomplished by circulating fluid in the pipes 13 or other conventional cooling means.

Where the specific gravity of the pumped oil is greater than the specific gravity of the lubricating oil, the perforation 32 should be in the bottom of the compartment, so that any leakage of the heavy fluid into the compartment will drain back otherwise the lighter lubricant which will at all times float upon the heavier fluid will be displaced from the bearing compartment. In such cases the arrangement shown in Fig. 1 is preferable.

The same is true if water be pumped and is under pressure in the space 6, the perforation 40 should be at the bottom or lowest point of the compartment 36.

If, on the other hand the oil being pumped is lighter than that employed for lubricating and filling the bearing compartment, the perforation should be in the upper part of the diaphragm and communicate with the upper part of the bearing compartment. Such arrangement is shown in Fig. 2.

The position of the perforation 32 set forth in Fig. 2 corresponds with the most advantageous position where a light oil is being pumped as for example gasoline or kerosene and a heavy oil is being employed for lubrication from the main supply tank 9.

The perforation 40 in the diaphragm 41 in Fig. 1 is the proper arrangement where the fluid being pumped is heavier than the lubricating oil; for example where heavy crude oil is being pumped directly from the wheels and containing more or less sand and where a relatively light lubricant is being supplied from the tank 19.

The type and arrangement of apparatus shown in Fig. 2 would be well suited to the transfer of lighter gravity hydrocarbons through pipe lines or from tank to tank whereas the type and arrangement of apparatus of Fig. 1 would be suited for the pumping of crude or dirty oil under high pressures.

The relative pressures are shown diagrammatically by the arrows 7, 43 and 44, the arrow 7 representing the pumped pressure, the arrow 43 representing the pressure of the lubricant forced between the bearing and the journal and the arrow 44 the difference between the two or the resulting or differential pressure which will establish the rate of flow of the lubricant into and which mixes with the pumped fluid. This mixing with the pumped fluid may take place immediately on its leaving the bearing surfaces, where no bearing compartment (36 or 33 of Figs. 1 and 2 respectively), or after filling and then exuding through the perforation at 40 or 32 according to its position but in either case clean and pure lubricant is at all times retained between the bearing and journal surfaces as a perfect lubricating film.

I claim:

1. In combination with apparatus employing a fluid pressure chamber, a shaft passing through said chamber, a bearing supporting said shaft, a diaphragm spaced from and dividing a minor portion of said chamber from said bearing, injecting means adapted to force lubricant through said bearing into said minor chamber portion, a restricted passage between said minor portion and remaining portion of the chamber whereby lubricant is collected in said minor portion and thence forced through said diaphragm into the other portion of said chamber, centrifugal pump means within said chamber adapted to establish pressure within said other portion and wherein the lubricant is injected under a relatively higher pressure than that established by the pump.

2. In combination with apparatus employing a fluid pressure chamber, a shaft passing through said chamber, a bearing supporting said shaft, a diaphragm spaced from and dividing a minor portion of said chamber from said bearing, injecting means adapted to force lubricant through said bearing into said minor chamber portion, a restricted passage between said minor portion and remaining portion of the chamber whereby lubricant is collected in said minor portion and thence forced through said diaphragm into the other portion of said chamber where a fluid under pressure less than that under which the oil is injected is employed in said other chamber portion.

3. In combination with apparatus employing a fluid pressure chamber, a shaft passing through said chamber, a bearing supporting said shaft, a diaphragm spaced from and dividing a minor portion of said chamber from said bearing, injecting means adapted to force lubricant through said bearing into said minor chamber portion, a restricted passage between said minor portion and remaining portion of the chamber whereby lubricant is collected in said minor portion and thence forced through said diaphragm into the other portion of said chamber where a fluid under pressure less than that under which the oil is injected is employed in said other chamber portion and wherein the restricted passage is through the lower portion of said diaphragm.

ALADAR HOLLANDER.